United States Patent
Hong et al.

(10) Patent No.: US 7,510,331 B2
(45) Date of Patent: Mar. 31, 2009

(54) BUSHING STRUCTURE FOR MOTOR

(75) Inventors: Alex Hong, Koahsiung (TW); Shih Chang Huang, Koahsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 391 days.

(21) Appl. No.: 11/272,675

(22) Filed: Nov. 15, 2005

(65) Prior Publication Data

US 2007/0071379 A1  Mar. 29, 2007

(30) Foreign Application Priority Data

Sep. 26, 2005 (TW) .............................. 94133349 A

(51) Int. Cl.
*F16C 17/10* (2006.01)
*H02K 7/08* (2006.01)

(52) U.S. Cl. .................... 384/243; 384/119; 310/90

(58) Field of Classification Search ................ 384/100, 384/107, 113, 114, 115, 119, 243–246, 903; 310/90; 417/354, 423.12, 423.13

See application file for complete search history.

(56) References Cited

U.S. PATENT DOCUMENTS

| 3,663,849 | A | * | 5/1972 | Heob ........................... 310/90 |
| 4,750,878 | A | * | 6/1988 | Nix et al. ..................... 384/296 |
| 4,806,024 | A | * | 2/1989 | Tanaka et al. ................ 384/125 |
| 5,211,485 | A | * | 5/1993 | Hoshino ...................... 384/296 |
| 6,538,355 | B1 | * | 3/2003 | Horng et al. .................. 310/90 |
| 6,592,263 | B2 | * | 7/2003 | Chuang ....................... 384/125 |
| 6,720,694 | B2 | * | 4/2004 | Horng et al. .................. 310/90 |

* cited by examiner

*Primary Examiner*—Thomas R Hannon
(74) *Attorney, Agent, or Firm*—Bacon & Thomas, PLLC

(57) ABSTRACT

A bushing structure for a motor has a shaft tube, a fastener and a bushing disposed on a hub. A bushing is disposed a bearing therein so that the shaft of the rotor penetrates through the bearing and rotates therein. The bushing has an engaging part over the bottom thereof and the engaging part integrally extends from the inner wall of the bushing and forms a plurality of projected and elastic plates capable of being inserted in the scoop channel over the end of the shaft to replace a snap ring such that the shaft and the rotor can be integrally disposed and positioned to prevent from falling off. As such, it is free of the concern if the snap ring will fall off or the issue posed on the assembling direction while assembling the bushing and the fastener.

2 Claims, 5 Drawing Sheets

BUSHING STRUCTURE FOR MOTOR

FIELD OF THE INVENTION

The invention relates to a bushing structure for a motor, and in particular to the structure capable of maintaining the rotating balance and rotating stability of the rotor.

BACKGROUND OF THE INVENTION

The conventional motor bushing structure is as shown in the Taiwan Patent Publication No. 591860 "Bushing assembly structure of motor".

Please refer to FIG. 1 showing a motor shaft tube assembly structure, which includes a hub 1, thereon disposed a shaft tube 11, a fastener 2 and a bushing 14. The shaft tube 11 has a shaft hole and annular wall corresponding to the stator set 3. The fastener 2 contains a cap 21, several arms 22 and several barbs 23. The arm 22 extends from the top of the cap 21 and the barb 23 is formed on the top side of the arm 22. The shaft tube 14 is disposed inside the fastener 2 and contains a bearing 4 therein. When the bushing 14 and the fastener 2 are disposed inside the shaft tube 11, the fastener 2 is utilized to clasp the stationary stator set 3 by means of the barb 23 of the arm 22 and to inwardly hold the bushing 14 by means of the arm 22 so that the bushing 14 is tightly integrated with the bearing 4, allowing the shaft 51 of the rotor 5 to penetrate through the bearing 4 and rotate therein.

Notwithstanding, the structure design of the aforementioned prior art has its own limit. For instance, before a snap ring 52 is inserted between the base 141 of the shaft tube 14 and the cap 21 of the fastener 2, the snap ring 52 shall be fitted in the stairs of the cap 21 of the fastener 2 and then the bushing 14 is placed inside the fastener 2 such that the snap ring 52 can be fastened and positioned when the bushing 14 is held by the arm 22 of the fastener 2.

However, such assembling method is not very convenient. During the course of placing the bushing 14 in the fastener 2, care shall be taken constantly concerning if the snap ring 52 falls off the stairs 25, easily resulting in the failure upon engaging and positioning the shaft 51 and the rotor 5 as well as the inferior quality. Normally, such assembling issue is hard to be controlled.

SUMMARY OF THE INVENTION

In view of this, the invention thus provides a bushing structure for a motor coupled with a fastener and disposed inside the shaft tube of a hub, wherein the bushing accommodates a bearing so that the shaft of the rotor penetrates through the bearing and rotates therein. Besides, an engaging part of the bushing is disposed on the inner wall of the bottom portion thereof and has a structure in form of a plurality of projected and elastic plates.

While assembling, the plates of the engaging part is inserted in the scoop channels over the end of shaft, and the shaft and the rotor are integrally disposed and positioned so as to replace the snap ring design of the aforementioned prior art. On the one hand, it is free of the concern if the snap ring will fall off while assembling the bushing and the fastener and how the assembling direction shall be restricted either, thus simplifying the assembling process; on the other hand, the production cost can be lowered to enhance the competitive edge in the market.

DETAILED DESCRIPTION OF THE PREFERRED EMBODIMENT

Figure 1:
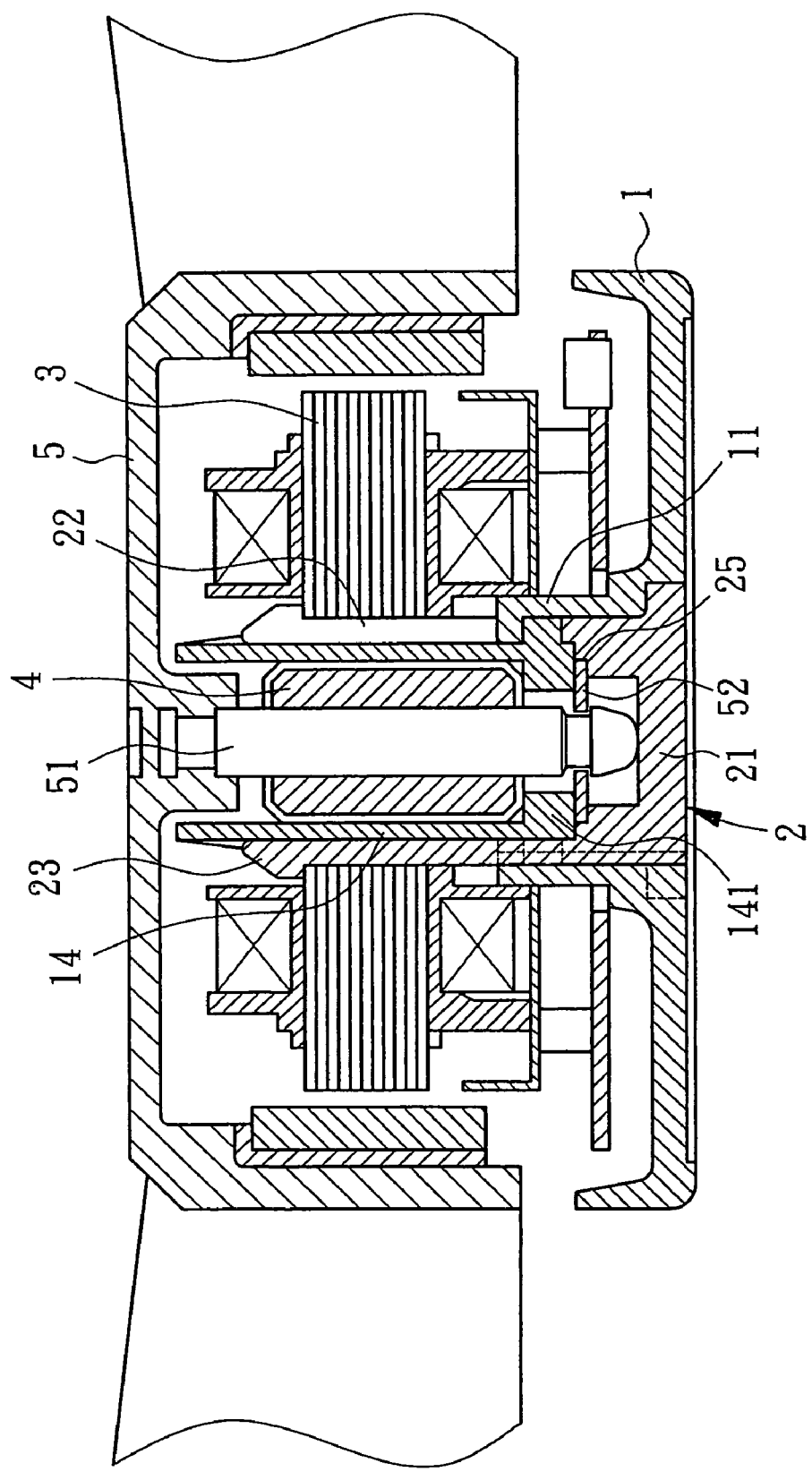
FIG. 1 is an integral cross-sectional schematic view showing the Taiwan Patent Publication No. 591860 "Assembling structure of motor shaft tube"

The invention relates to a bushing structure for a motor. To further definitely express the objective, characteristics and advantages of the present invention, few preferred embodiments together with the detailed description of the figures are listed as follows;

Moreover, partial structure of the invention is equivalent to address the features of the prior art. As a result, both identical portions in terms of the features are marked by the same reference numerals, and the structure and functions thereof are unnecessarily addressed once again.

Figure 2:
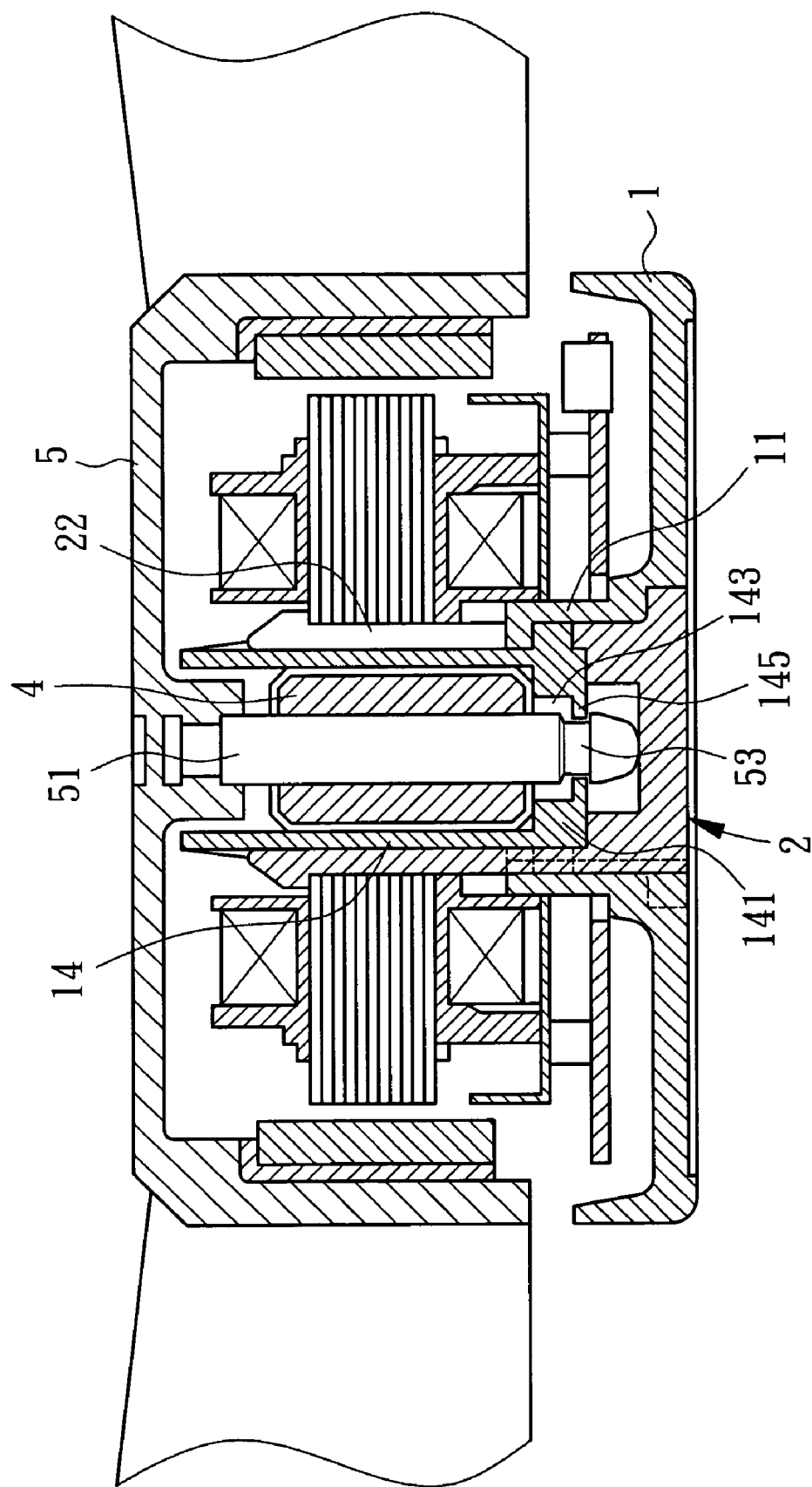
FIG. 2 is an integral cross-sectional schematic view showing the first preferred embodiment of the present invention.
Figure 3:
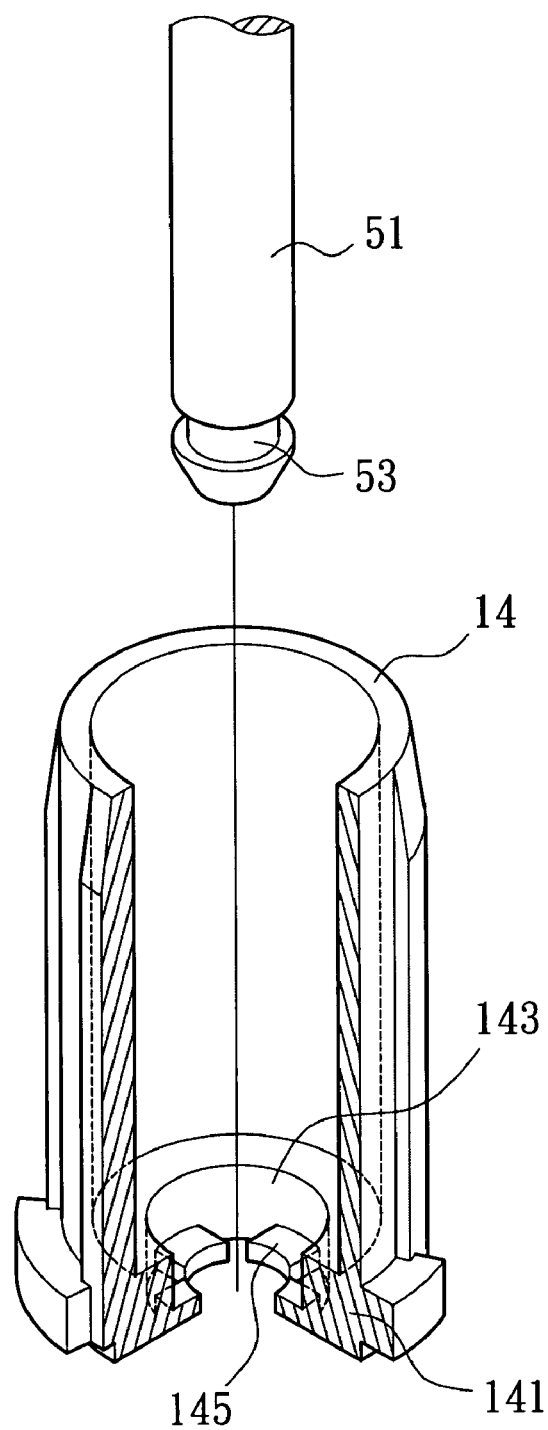
FIG. 3 is an exploded schematic view showing the bushing and shaft in the first preferred embodiment of the present invention.

FIG. 2 and FIG. 3 illustrate the first preferred embodiment of the present invention having a hub 1 thereon disposed a shaft tube 11, a fastener 2 and a bushing 14, wherein a bearing is accommodated by the bushing 15 so that the shaft 51 of the rotor 5 penetrates through the bearing 4 and rotates therein, the structure of the bushing 14 is featured by a base 141 disposed on the bottom thereof, a through hole 143 is penetrated through the base 141, the inner wall of the through hole 143 is disposed the engaging part 145 featured by a plurality of projected and elastic plates and a center hole with an inner diameter smaller than the outer diameter of the shaft 51 that corresponds to the shaft 51.

While assembling, the bearing 4 is disposed in the bushing 14 so that the bearing 4 is exactly located on top of the base 141. The bushing 14 is disposed inside the fastener 2 and is held and fixed by the arms 22 of the fastener 2 so as to be integrally disposed in the shaft tube 11. After the shaft 51 of the rotor 5 penetrates through the bearing 4, the scoop channel 53 over the end of the shaft 51 is fitted with the engaging part 145 to secure a positioning effect and prevent the rotating rotor 5 from falling off.

As the through hole 143 of the bushing 14 is disposed the engaging part 145 for positioning the shaft 51 and replacing the snap ring 52 (as shown in FIG. 1) designed in the prior art, whether the snap ring 52 will fall off is no longer an issue to be taken into account while assembling the bushing 14 and the fastener 2, and meanwhile, such assembling process is not subject to the limitation posed on the assembling direction either, further simplifying the assembling process. Moreover, because the snap ring 52 designed in the prior art is unnecessary, the cost of the snap ring 52 is saved and the overall cost is relatively reduced and the competitive edge in the market is enhanced.

Figure 4:
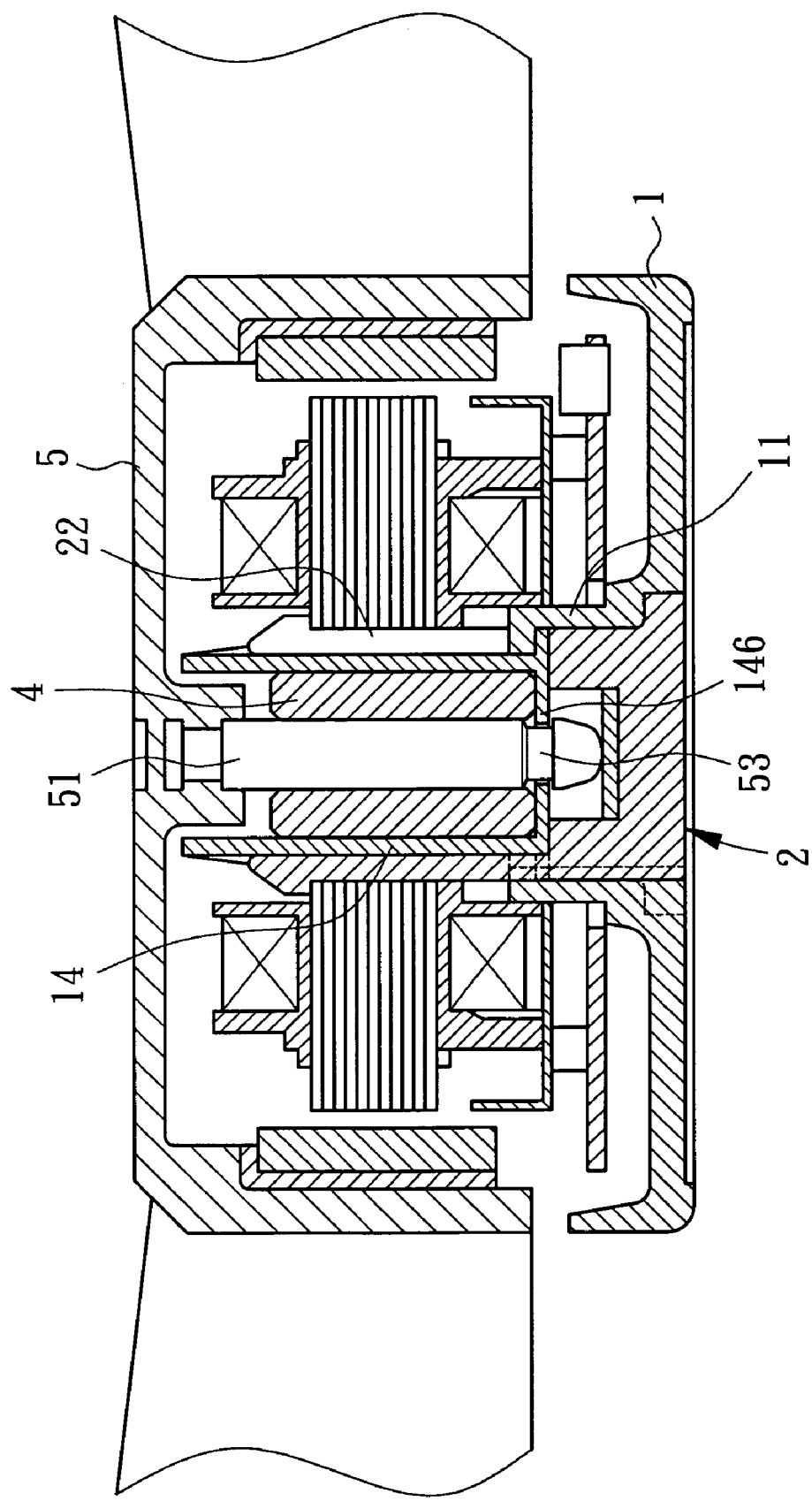
FIG. 4 is an integral exploded schematic view showing the second preferred embodiment of the present invention.
Figure 5:
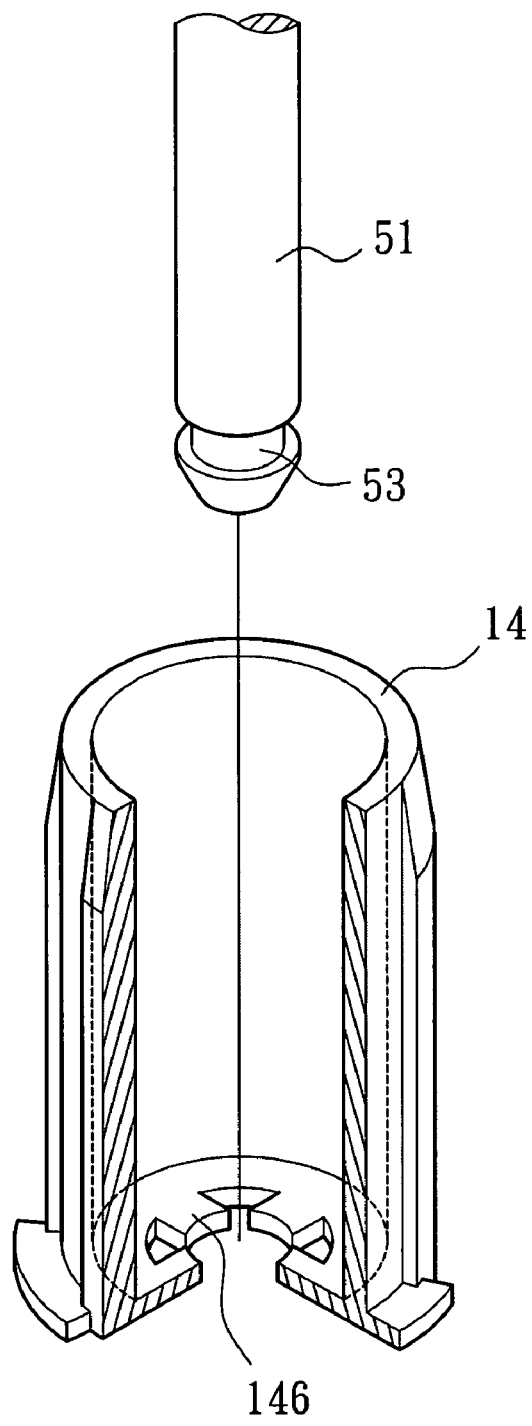
FIG. 5 is an exploded schematic view showing the bushing and shaft in the second preferred embodiment of the present invention.

FIG. 4 and FIG. 5 illustrate the second preferred embodiment of the present invention. The structure of the bushing 14 thereof is described as follows:

The engaging part disposed on the inner wall on the bottom of the bushing 14 so that the engaging part 146 is exactly located beneath the bearing 4. The engaging part 146 takes the form of a plurality of projected and elastic plates and provides a center hole having an inner diameter smaller than the outer diameter of the shaft 51 and corresponding to the shaft 51.

While assembling, the bearing 4 is accommodated inside the bushing 14, the bearing 4 is exactly on top of the engaging part 146, and the bushing 14 is disposed in the fastener 2 and is held and fixed by the arm 22, so as to be integrally disposed inside the shaft tube 11. After the shaft 51 of the rotor 5 penetrates through the bearing 4, the scoop channel 53 over the end of the shaft 51 is fitted with the engaging part 146 to attain the positioning effect and prevent the rotating rotor 5 from falling off.

As the additionally disposed engaging part 146 of the bushing 14 can be fitted in and position the shaft 51 so as to replace the snap ring 52 (as shown in FIG. 1) in the prior art, whether the snap ring 52 will fall off is no longer an issue to be taken into account while assembling the bushing 14 and the fastener 2, and meanwhile, such assembling process is not subject to the limitation posed on the assembling direction either, further simplifying the assembling process. Moreover, because the snap ring 52 designed in the prior art is unnecessary, the cost of the snap ring 52 is saved and the overall cost is relatively reduced and the competitive edge in the market is enhanced.

In sum, the present invention, by virtue of the additionally disposed engaging part of the bushing, can dispose and position the shaft without requiring the additional snap ring. On the one hand, the assembling process of the bushing and the fastener is free of the concern that the snap ring will fall off and is not subject to the limitation posed on the assembling direction, thus simplifying the assembling process. Therefore, the present invention not only has a novelty and a progressiveness, but also has an industry utility.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A bushing structure for a motor, comprising:
   a shaft tube disposed on a hub,
   a bushing disposed inside a fastener, the bushing held and fixed by arms of the fastener to integrally dispose the bushing within the shaft tube,
   a bearing disposed within said bushing so that a shaft of a rotor penetrates through said bearing and rotates therein,
   wherein an engaging part in the form of a plurality of projected and elastic plates is disposed on an inner wall of the bushing beneath said bearing and located on a bottom of said bushing and fitted in a scoop channel of said shaft to prevent said rotor from falling off.

2. The bushing structure for a motor of claim 1, wherein said bushing includes a base positioned beneath said bearing, a through hole is penetrated through said base, and said engaging part is disposed on an inner wall of said through hole.

* * * * *